US011859356B2

(12) United States Patent
Linville et al.

(10) Patent No.: US 11,859,356 B2
(45) Date of Patent: Jan. 2, 2024

(54) TEMPORARY LIGHT STRIP SYSTEM

(71) Applicant: Evolutionary Markings, LLC, Boise, ID (US)

(72) Inventors: Thomas Linville, Boise, ID (US); Douglas Baker, Boise, ID (US)

(73) Assignee: Evolutionary Markings, LLC, Boise, ID (US)

( * ) Notice: Subject to any disclaimer, the term of this patent is extended or adjusted under 35 U.S.C. 154(b) by 0 days.

(21) Appl. No.: 17/519,427

(22) Filed: Nov. 4, 2021

(65) Prior Publication Data

US 2022/0136185 A1 May 5, 2022

Related U.S. Application Data

(60) Provisional application No. 63/109,509, filed on Nov. 4, 2020.

(51) Int. Cl.
*F21S 4/28* (2016.01)
*F21V 23/02* (2006.01)
(Continued)

(52) U.S. Cl.
CPC ................ *E01F 9/20* (2016.02); *E01F 9/559* (2016.02); *E01F 9/582* (2016.02); *E01F 9/615* (2016.02); *F21S 2/005* (2013.01); *F21S 4/28* (2016.01); *F21S 8/032* (2013.01); *F21V 23/02* (2013.01); *F21V 23/0407* (2013.01); *F21V 23/0471* (2013.01); *F21V 23/06* (2013.01); *F21V 31/04* (2013.01); *F21W 2111/02* (2013.01); *F21Y 2103/10* (2016.08); *F21Y 2115/10* (2016.08)

(58) Field of Classification Search
CPC . E01F 9/559; E01F 9/582; E01F 9/615; F21S 4/20; F21S 4/28; F21S 8/032; F21W 2111/02
See application file for complete search history.

(56) References Cited

U.S. PATENT DOCUMENTS 3,996,556 A 12/1976 Eigenmann
4,993,868 A * 2/1991 Eigenmann .............. G08G 1/04 404/12
(Continued)

FOREIGN PATENT DOCUMENTS

EP 0422694 A2 4/1991
EP 2701139 A1 2/2014

*Primary Examiner* — William N Harris
(74) *Attorney, Agent, or Firm* — Scott Swanson; Shaver & Swanson, LLP

(57) ABSTRACT

A modular system of light strips is configured for use on a roadway surface. The light strips are configured to withstand vehicular traffic driving over the light strips. The light strips have a rigid, durable housing protecting a series of LEDs within the housing. LED lenses direct light from the LEDs through the sidewall of the housing at vehicular traffic on the roadway. The channel is filled with a protective material, such as a polymer resin that protects the LEDs and power supply. The modular system includes a power source or can connect to a power grid. The modular system can include a sensor to activate the system and/or to control the light brightness Preferably the light strips connect together or can be substituted for one another to be interchangeable and easily carried, moved, installed and disassembled.

22 Claims, 7 Drawing Sheets

(51) Int. Cl.

| | |
|---|---|
| ***F21V 31/04*** | (2006.01) |
| ***F21V 23/04*** | (2006.01) |
| ***E01F 9/559*** | (2016.01) |
| ***F21V 23/06*** | (2006.01) |
| ***E01F 9/582*** | (2016.01) |
| ***E01F 9/615*** | (2016.01) |
| ***F21S 8/00*** | (2006.01) |
| ***F21S 2/00*** | (2016.01) |
| ***F21Y 115/10*** | (2016.01) |
| ***F21Y 103/10*** | (2016.01) |
| ***F21W 111/02*** | (2006.01) |
| ***E01F 9/20*** | (2016.01) |

(56) References Cited

U.S. PATENT DOCUMENTS

| | | | | |
|---|---|---|---|---|
| 5,839,816 | A | 11/1998 | Varga | |
| 5,848,837 | A | 12/1998 | Gustafson | |
| 5,984,570 | A * | 11/1999 | Parashar | E01F 9/559 40/565 |
| 6,210,017 | B1 * | 4/2001 | Miura | E01F 9/559 362/240 |
| 6,354,714 | B1 * | 3/2002 | Rhodes | F21S 8/022 362/153.1 |
| 6,384,742 | B1 | 5/2002 | Harrison | |
| 6,579,035 | B1 | 6/2003 | Watson | |
| 6,866,394 | B1 | 3/2005 | Hutchins | |
| 7,688,222 | B2 * | 3/2010 | Peddie | G08G 1/096783 116/63 P |
| 8,322,883 | B2 * | 12/2012 | Cleaver | F21V 3/04 362/249.02 |
| 11,320,104 | B1 * | 5/2022 | Perkins | E01F 9/559 |
| 2003/0053307 | A1 | 3/2003 | Talamo | |
| 2005/0238425 | A1 * | 10/2005 | Safar | E01F 9/559 404/16 |
| 2007/0070618 | A1 * | 3/2007 | Talamo | F21S 4/20 362/240 |
| 2009/0262522 | A1 * | 10/2009 | Burns | E01F 9/559 362/153.1 |
| 2017/0097128 | A1 | 4/2017 | Stafford | |
| 2017/0261187 | A1 * | 9/2017 | Meir | H01L 33/58 |
| 2019/0226650 | A1 | 7/2019 | Boehmer | |

* cited by examiner

TEMPORARY LIGHT STRIP SYSTEM

PRIORITY/CROSS-REFERENCE TO RELATED APPLICATIONS

This application claims the benefit of U.S. Provisional Application No. 63/109,509, filed Nov. 4, 2020 the disclosure of which is incorporated by reference.

TECHNICAL FIELD

The presently disclosed technology generally relates to the field of pedestrian, bicycle, and worker safety at, for example, crosswalks and construction zones, and more particular embodiments relate to systems or methods of signaling traffic at such intersections and construction areas.

BACKGROUND

While advances in transportation technologies have already been made to build, improve, and repair roadways, the number of fatalities for pedestrians, bicyclists, and construction zone workers continue to rise as a result of a multitude of contributing factors such as drivers distracted by cell phone use or multitasking with car gadgets and controls while driving, the evolution of larger vehicles, and an increase congestion especially in urban areas.

Pedestrians and bicyclists often do not have a method to alert drivers and/or vehicles that they intend to cross roadways that are under construction or reconstruction, or are awaiting the installation of permanent pedestrian crossing signals.

SUMMARY OF THE DISCLOSURE

The purpose of the summary is to enable the public, especially scientists, engineers, and practitioners in the art who are not familiar with patent or legal terms or phraseology, to quickly determine the nature and essence of the technical disclosure of the application from a cursory inspection. The summary is neither intended to define the inventive concept(s) of the application, which is measured by the claims, nor is it intended to be limiting as to the scope of the inventive concept(s) in any way.

Two primary potential uses of the inventive concepts disclosed herein are contemplated. A Temporary Cross Walk Warning System (TCWWS) and a Temporary Construction Zone Warning System (TCZWS) (referred to collectively as temporary light strip systems) to advance pedestrian, bicycle, and construction work zone safety.

If temporary crosswalks are made available, existing industry practices attach warning lights to crosswalk signal activation poles located along the roadside. This results in compromised visibility compared to the increased visibility of in-road lighting contained in the TCWWS and TCZWS systems. The increased visibility from in-road flashing LED lights is an interim solution that enhances and improves pedestrian and worker safety until a more permanent crosswalk system can be installed at the end of construction. Construction zone workers often are at serious risk of injury or death by inattentive drivers approaching construction zones at high speeds. The purpose of the TCZWS is to alert drivers and or vehicles to slow down and observe posted speed limitations within the construction zone for the protection of pedestrians and workers. These inventions, designated as TCWWS and TCZWS, are designed for temporary or limited time installation only. Because of the fluid nature of construction projects, the TCWWS and/or TCZWS may be frequently moved or replaced throughout the construction project to provide the safest environment.

What is disclosed is a method of providing enhanced traffic signaling utilizing "on roadway lights" in the form of a light strip affixed to a road surface. What is further disclosed is a light strip configured for application on or in a roadway, with the light strip configured to illuminate in order to signal to oncoming traffic the presence of the light strip. For example, the light strip can be utilized as a temporary cross walk or to signal that a vehicle is entering an area in which workers are actively working, such as within an area of a construction zone.

In the preferred embodiment, the light strip will have one or more Light Emitting Diode (LED) lights and/or another light source. The light strips preferably include a plurality light configured for illumination, de-illumination, flashing, or other actions such as changing color, and are activated by the pedestrian, bicyclist, or approaching vehicle. The LEDs can be positioned in groups in a spaced apart arrangement, such as ten groups of seven LEDs each per twelve (12) foot stripe. Spacers can be utilized to retain the circuit board in position in the body.

Preferably the light strips are constructed having an outer body or shell of hard material, such as metal, durable plastic, or ceramic. In a preferred embodiment the outer body is a rectangular channel, preferably constructed of metal. A printed circuit board having LEDs integrated on the board extends lengthwise through the channel. Preferably the outer body has a plurality of openings in a wall of the outer body. The openings are configured for insertion of a lens through each opening. Each opening is configured for directing light from one of the LEDs out through each opening in the wall of the channel.

The channel is filled preferably with a resin, such as a urethane resin or other suitable water-resistant material. A polyurethane resin is utilized in a preferred embodiment. The resin serves to protect the circuit board associated LEDs and integral power supply from impact of vehicles over the light strip as well as to provide protection from water. Preferably the lens extends through the housing and ends proximate to an LED on the board. The resin is poured into the channel and fills the channel so as to surround and protect the circuit board and LEDs and allow for light transmission from the LED to the pipe of the lens and through the lenses to be directed out of the channel at an oncoming vehicle.

The light strips are elongated so as to be configured to span a distance laterally when positioned on the road. Preferably each light strip is long enough to extend the length of a road lane, which is are typically ten to thirteen (10-13) feet in the United States, with a preferred length of twelve (12) feet.

One or more connected or independently placed light strips are temporarily affixed to the roadway by various methods in a designated location to allow for safe passage by alerting vehicles traveling in either direction as to the presence of a pedestrian or bicyclist or construction zone. Various materials including but not limited to metal, rubber, or ceramics may be used in the construction of the light strip. The light strips are configured to withstand being driven over by motor vehicles, including heavy construction vehicles such as earth moving trucks and loaders. The light strips include a body that is made to withstand such traffic, with the light source(s) preferably embedded in the body or otherwise at least partially protected by the body. Alternatively, each light source itself can be constructed to withstand such use.

The LED light strips are modular such that a series of light strips can be utilized together. This allows for non-functioning and/or broken light strips to be replaced as well as to allow for a series of light strips to be utilized. The light strips are preferably configured to be directly connected, although connectors can be utilized that provide power between the strips. Preferably a power connection channel section is utilized that is configured to connect to an end of the LED light strip. An L-shaped modular section can be utilized at channel section ends to provide notice of signaling to a pedestrian when the LED light strip assembly is illuminated.

A pedestrian activation button or device, such as a sensor, may be included to activate the light strips. The light strip(s) can be configured to illuminate when a pedestrian pushes a button or otherwise activates the call switch, or alternatively if a sensor senses the pedestrian is preparing the cross at the cross walk it can activate the light strips.

The system may include one or more sensors that are configured to sense the presence of a pedestrian or bicyclist and cause the controller to activate the light strip(s). Alternatively one or more sensors may be utilized that are configured detect low ambient light and/or high ambient light periods for causing a controller to increase or decrease the brightness of the LED lights embedded in the light strips.

An approaching vehicle sensor can be utilized in a construction zone to activate the light strip(s) to inform the approaching vehicle that the vehicle is approaching construction workers in an active zone. Alternatively, one or more activity sensors can be positioned in the active zone to sense when construction workers are located in the zone so that if construction workers are not in the active zone, the system stays in a stand-by function. This allows the system to conserve power in the event construction workers are not actively in an activity zone. If the activity sensors sense a construction worker in the active zone, the system activates and either is capable of activating the light strips if a vehicle approaches or alternatively activates the light strips in the event the light strips are on whenever a construction worker (or other person) is in the zone.

Activation may also communicate with “smart vehicle” technologies including autonomous vehicles and or personal cell phones or other devices within the vehicle for the purposes of alerting the driver and vehicle. It is contemplated these vehicles or devices will then automatically slow down and/or stop.

The TCWWS or TCZWS may be powered by one or more mobile or permanent power sources including but not limited to solar, batteries, generators vibration harvesting or temporarily hard wired into the power grid.

Bluetooth, Infra-Red, Wi-Fi, Hard Wired or other technologies may be used to communicate and/or activate the functions of the system.

Light strips may display one or more colors, i.e. Yellow, Red etc. to convey appropriate warning message.

Light strips may incorporate a “speed bump” feature as a speed control device.

Light strips may connect together or be substituted for one another allowing them to be interchangeable and to be easily carried, moved, installed, and disassembled.

Still other features and advantages of the presently disclosed and claimed inventive concept(s) will become readily apparent to those skilled in this art from the following detailed description describing preferred embodiments of the inventive concept(s), simply by way of illustration of the embodiments contemplated by carrying out the inventive concept(s). As will be realized, the inventive concept(s) is capable of modification in various obvious respects all without departing from the inventive concept(s). Accordingly, the drawings and description of the drawings are to be regarded as illustrative in nature, and not as restrictive in nature.

DETAILED DESCRIPTION OF THE FIGURES

Figure 1:
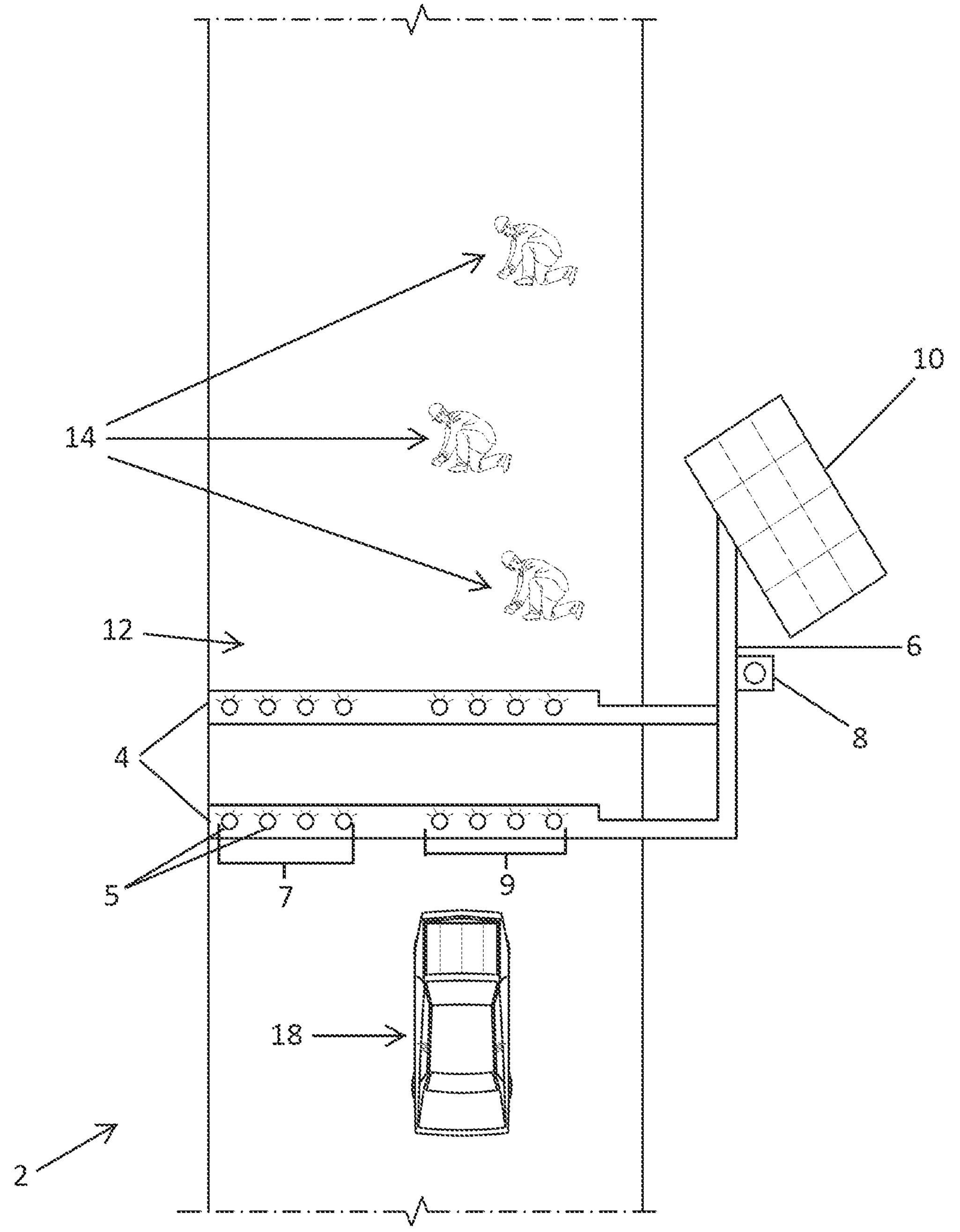
FIG. 1 illustrates a temporary light strip system used in conjunction with a construction zone.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a temporary light strip system in use in conjunction with a road way 2, and more particularly to illustrate a construction area 12. Two light strips 4 are positioned across the roadway. The light strips have a plurality of LED lights 5 that are configured to direct light from the LEDs at the oncoming vehicle 18. The LED lights are arranged in separate groups 7, 9 that can be configured for alternating illumination or simultaneous illumination, or individual LEDs within each group can be configured to alternate illumination and de-illumination. A power source 10 is proved to power two light strips via connection 6. The power source can be the depicted solar panel and associated battery or other energy storage device (not shown) or alternatively a connection to an energy grid. A sensor 8 is positioned to detect an oncoming vehicle 18. The depicted system is configured such that when the sensor senses the oncoming vehicle, the system causes the lights to be illuminated and/or flash (hereinafter illuminated and/or flash is referred to generically as "illuminate or illuminated"). The light strips illuminate to alert the oncoming vehicle of the construction workers 14 positioned in the construction zone F, alternatively called an active zone.

The light strips are constructed so as to withstand the rigors of vehicles driving over the light strips. A preferred embodiment of the light strips and associated system is shown in FIGS. 5-11. The light strips are preferably removably attached to the road surface, such as by adhesive, mounting anchors, double sided tape, straps, or other attachment mechanism.

Figure 2:
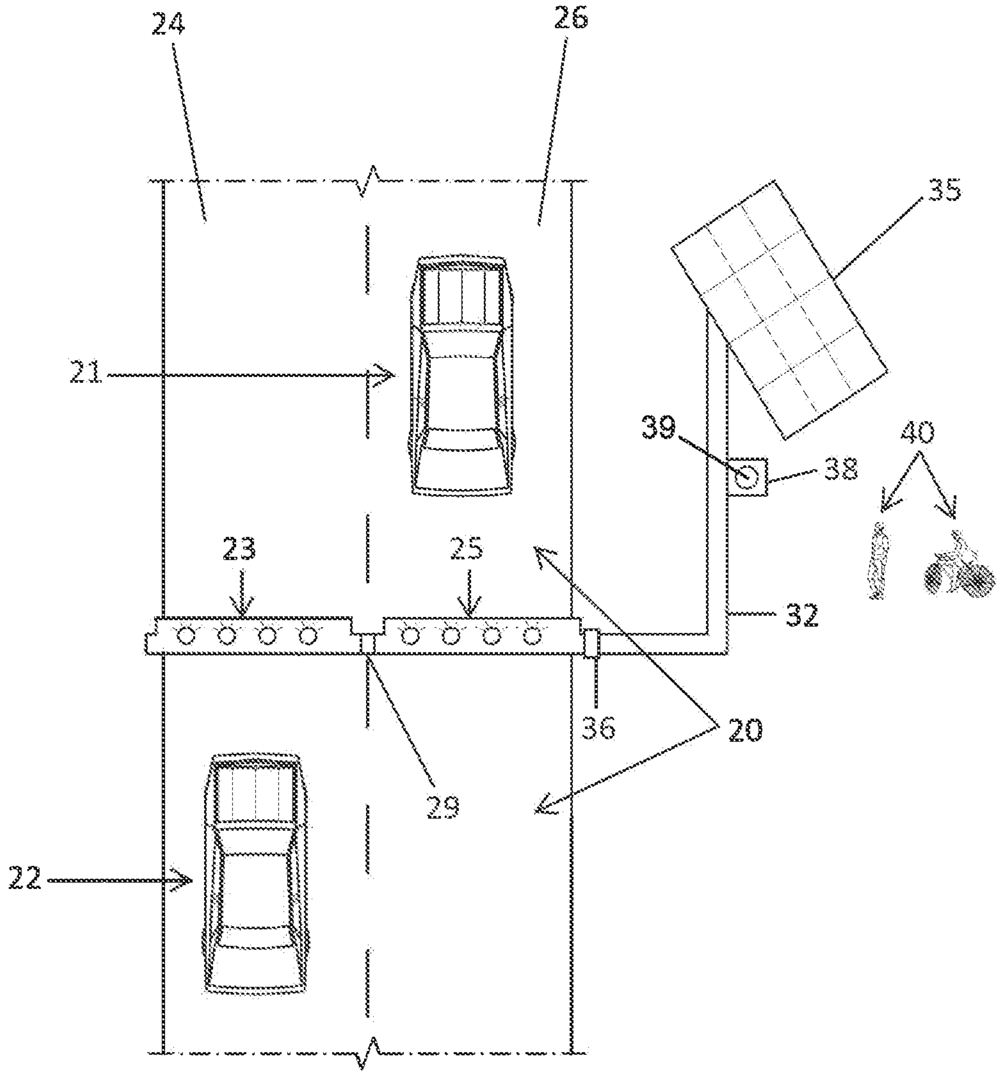
FIG. 2 illustrates a temporary light strip system used as a temporary cross walk.

FIG. 2 illustrates a preferred embodiment of a temporary light strip system in use in conjunction with a temporary cross walk in a roadway 20. The embodiment of FIG. 2 illustrates a preferred embodiment in which the temporary light strip systems are constructed in a modular arrangement. FIG. 2 illustrates two light strips 23, 25 positioned in neighboring lanes 24, 26. The light strips are configured such that light from each LED is directed at the on-coming vehicle 22 and not at vehicle 21 that has traveled over the light strip Each light strip section is preferably twelve (12) feet in length to extend the width of a standard lane of traffic, although alternate lengths can be utilized. In this system a series of light strips can be connected to extend across wider roadways, such as two, three, or four lane roadways. The connector mechanism 29 to connect two adjacent light strips to one another is also configured to connect the end of the light strip at connection 36 to a power supply 35, such as the depicted solar panel, an energy storage device and/or a power grid.

FIG. 2 further depicts a sensor 38 positioned on a pole 32. The sensor can be configured to detect the presence of a pedestrian or other person or animal prepared to cross at the location. The sensor can be a manual sensor such as a push button sensor 39 that is manually actuated by the pedestrian. The solar panel is mounted on the pole. A pedestrian and bicyclist 40 are shown prepared to cross at the crosswalk. The sensor can further be configured to sense ambient light conditions for adjusting the brightness of the LEDs, or alternatively a separate sensor can be utilized.

Figure 3:
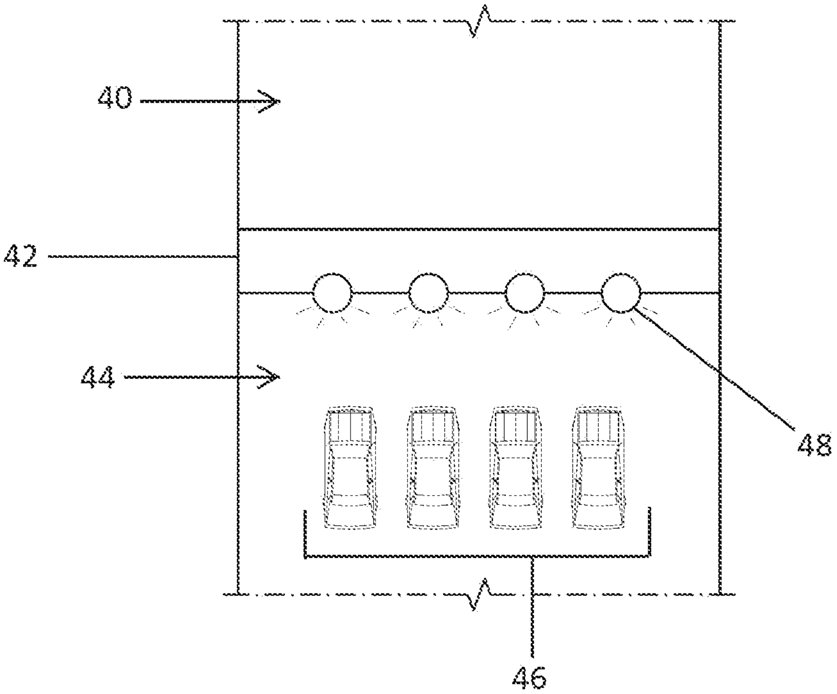
FIG. 3 illustrates a top view of an example of a temporary lights trip system indicating a cross walk.
Figure 4:
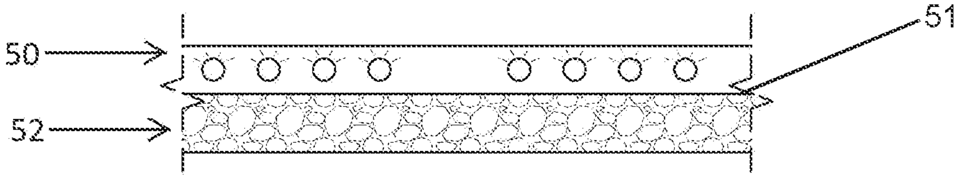
FIG. 4 illustrates a cross sectional view of a temporary light strip system attached to a road surface.

FIG. 3 illustrates a top schematic of a road surface having a temporary light strip system attached having a series of vehicles 46 stopped at the light strip in the roadway. The light strip 42 is positioned to delineate the construction zone or active zone 40, or alternatively a cross walk area, from oncoming traffic in the roadway 44. The light strip is configured such that light emitted by the LEDs 48 is directed at the oncoming vehicles. FIG. 4 illustrates a cross section of a roadway 52 having a light strip 50 attached to the roadway. As illustrated, light from the LEDs of the light strip is directed generally horizontally away from the light strip at oncoming traffic.

Figure 5:
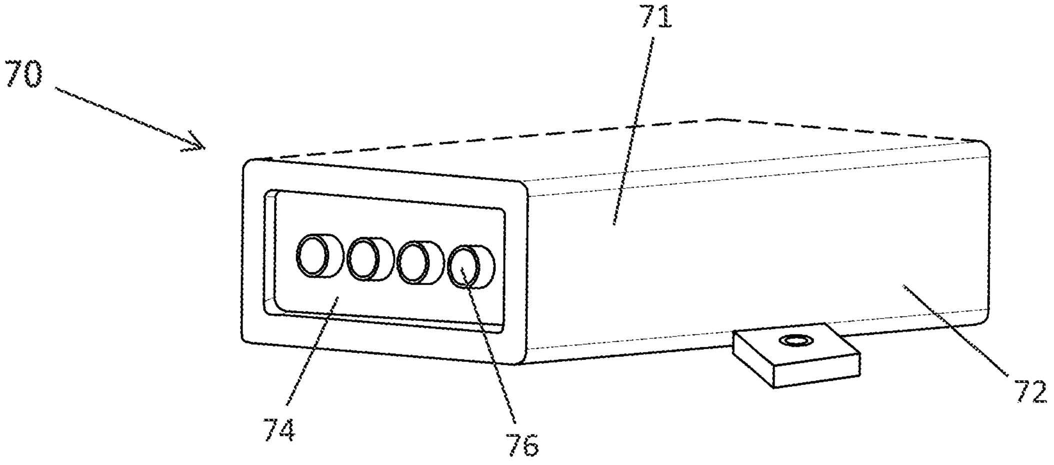
FIG. 5 illustrates an embodiment of a female connector for connecting modular light strip sections and/or a power supplies to a modular light strip section.

FIG. 5 illustrates an embodiment of a female connector 70 positioned at an end of the light strip, or alternatively on a power supply or power supply cord. The depicted connector has four female electrical pins 76. The light source is embedded in the light strip housing 71. The light strip housing in the depicted embodiment is a rectangular channel, preferably of metal although other material that will allow the light strip to withstand vehicular traffic over the light strip can be utilized. The light will be directed outward from the sidewall 72 of the housing. The light strip housing is configured to provide protection to the internal wiring of the light strip, as well as to the light source(s). The female pins are shown housed in a rubber connector pin housing 74 to prevent water and other contaminants, such as dust, from entering the channel. The female end connections are configured for mating engagement with male pins found on a corresponding light strip, or alternatively of a power input. The male and female configuration can be reversed with female pin receptacles provide on the power input and configured to mate with male pins of the light strip.

Figure 6:
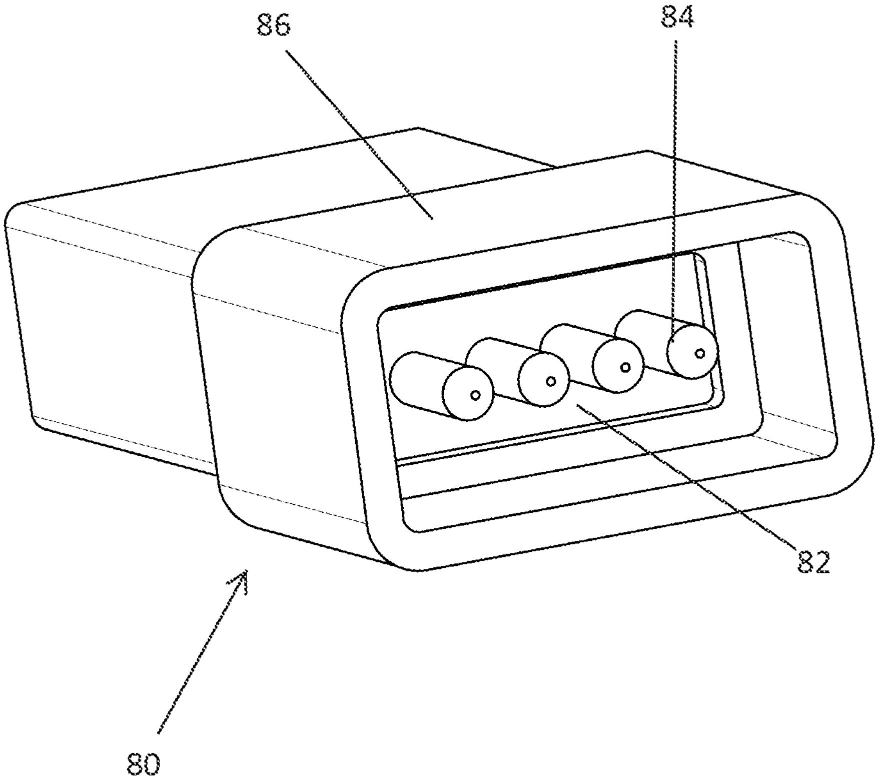
FIG. 6 illustrates an embodiment of a male connector for connecting modular light strip sections and/or a power supplies to a modular light strip section.
Figure 7:
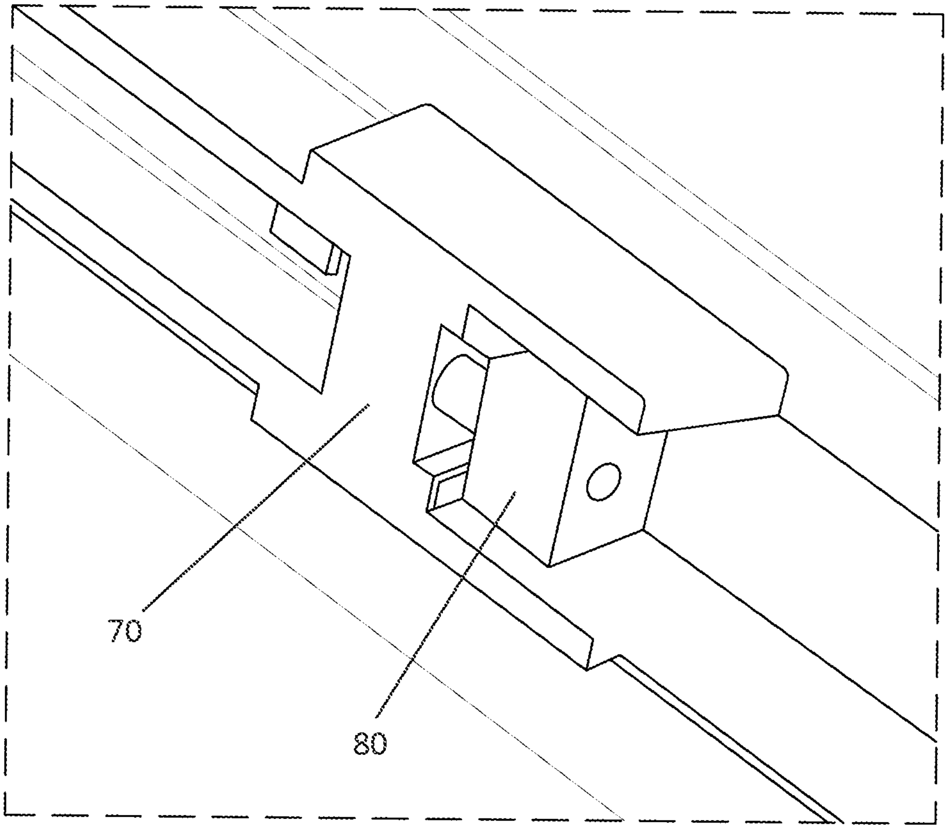
FIG. 7 illustrates a cross section of the female connector of FIG. 5 connected to the male connector of FIG. 6.

FIG. 6 illustrates an embodiment of a male connector 80 positioned at an end of the light strip, or alternatively on a power supply or power supply cord. The depicted connector has four male electrical pins. The depicted male connector utilizes an alignment sleeve 86 for aligning the male connector end of the light strip with a female connector end of a second light strip, or alternatively with a power supply cord. The male pins 84 are shown housed in a rubber connector pin housing 82 to provide protection from water and other contaminants, such as dust. FIG. 7 illustrates a cross section view of the assembled connector ends of FIG. 5 and FIG. 6. The male connector end has been inserted into the female connector end.

Figure 8:
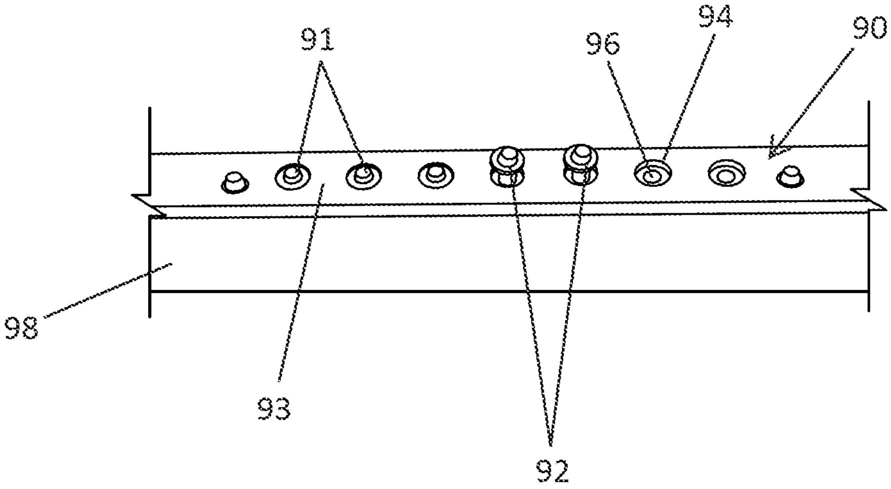
FIG. 8 illustrates a view of a second of a rectangular channel having recessed LED lenses extending through a wall of the channel.

FIG. 8 depicts a view of a preferred embodiment of a light strip housing 90 having LED lenses 91 installed in the side wall 93 of the housing. A circuit board strip with integral LEDs (illustrated in FIG. 10) is positioned within the metal housing. Lenses are positioned in openings 96 and extend through the housing proximate to each LED. The Lenses have a flange that is positioned so as to be countersunk in the sidewall of the channel in recess 94. Lenses 92 are shown partially positioned within openings.

Figure 9:
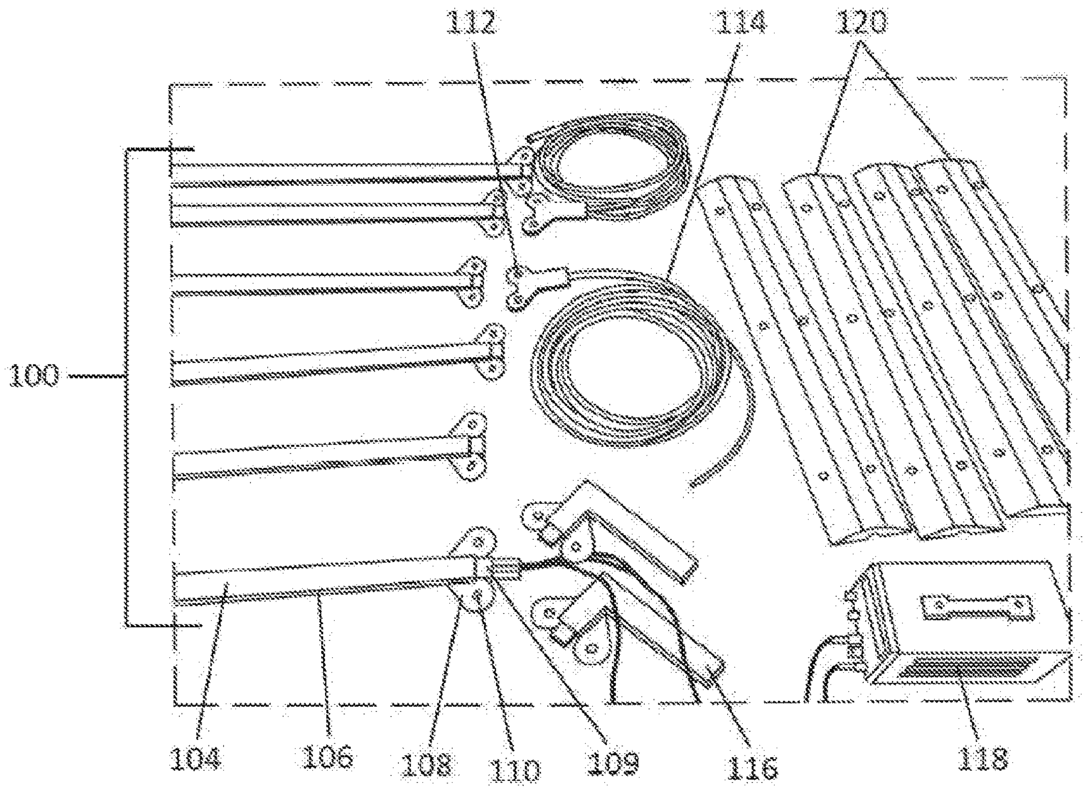
FIG. 9 illustrates modular components of an LED light strip system for use on a roadway.

FIG. 9 illustrates a plurality of components in a modular LED crosswalk system. A plurality of light strips 100 are provided. The light strips each has a series of lenses configured to direct light from LEDs positioned within the rectangular channel 104 out the sidewall 106 of each light strip. Each light strip is configured for attachment to a roadway via flanges 108 that have an opening 110 through which a connector is positioned to anchor each light strip to the roadway. Power connectors 112 are configured for mating engagement with the end 109 of each light strip. The power connectors are provided with flanges 112 that are configured for attaching the power connectors to the road surface. The flanges of the light strips can be aligned with the flanges of the power connector for mounting with a single connector through overlaid flanges. Similarly the end flanges of each light strip can be overlaid for concentric mounting. L-shaped sections 116 are provided at generally a ninety (90) degree angle to the light strips to direct light at pedestrians to signal to the pedestrians when the light strips have illuminated. A power source 118 is provided to power the lights strips. Rubber matting 120 is provided to protect the electrical cable, for example for us on the shoulder of a roadway.

The light strips of FIG. 9 are configured to provide continuous power between connected light strips. Preferably power conductors in the strip are continuous to minimize potential failure points. Preferably multiple power conductors are provided within each light strip to provide redundancy in the event of failure of a power line. The use of multiple power conductors can allow for control of groups of LEDs independently, thus allowing for alternating illumination to create a flashing effect between groupings.

Figure 10:
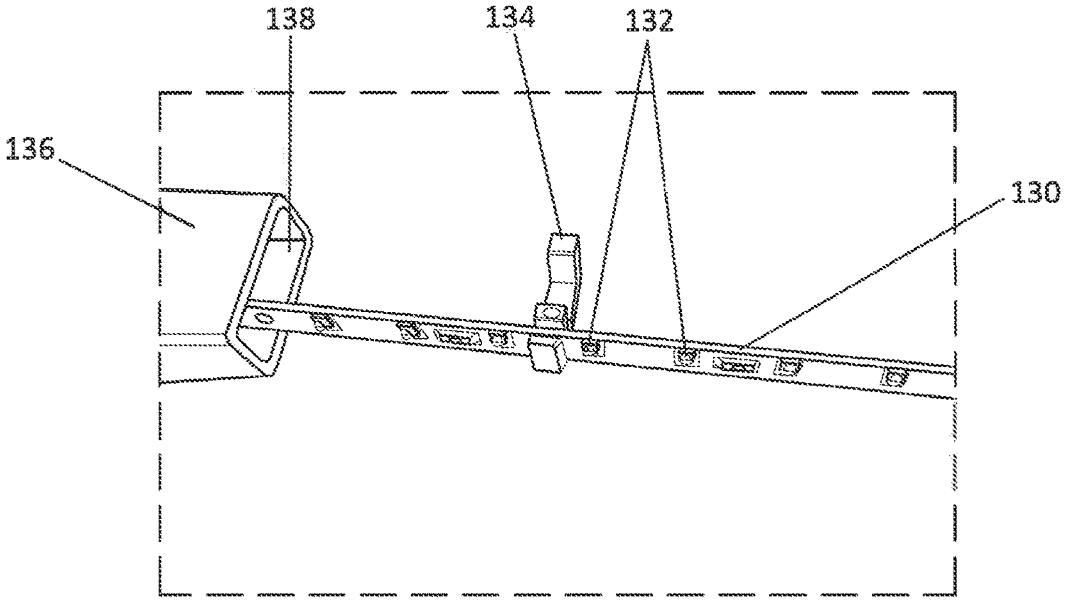
FIG. 10 illustrates a cross section of an LED light strip having a lens extending through a sidewall of a rectangular channel toward an LED on a printed circuit board.

FIG. 10 illustrates a partially exploded light strip showing printed circuit board 130 in a strip having LEDs 132 integral to the strip. A spacer 134 is provided to align the strip within the channel housing. The circuit board is inserted into the housing 136 with a lens extending through the sidewall to the LED to direct light from the LED outward (see FIG. 11). The void 138 in the channel is then filled with a protective material, such as a polymer resin, for example polyurethane. The protective material serves to protect the circuit board and LEDs from water and other elements, such as dust, as well as to provide flexibility to the light strip and channel.

Figure 11:
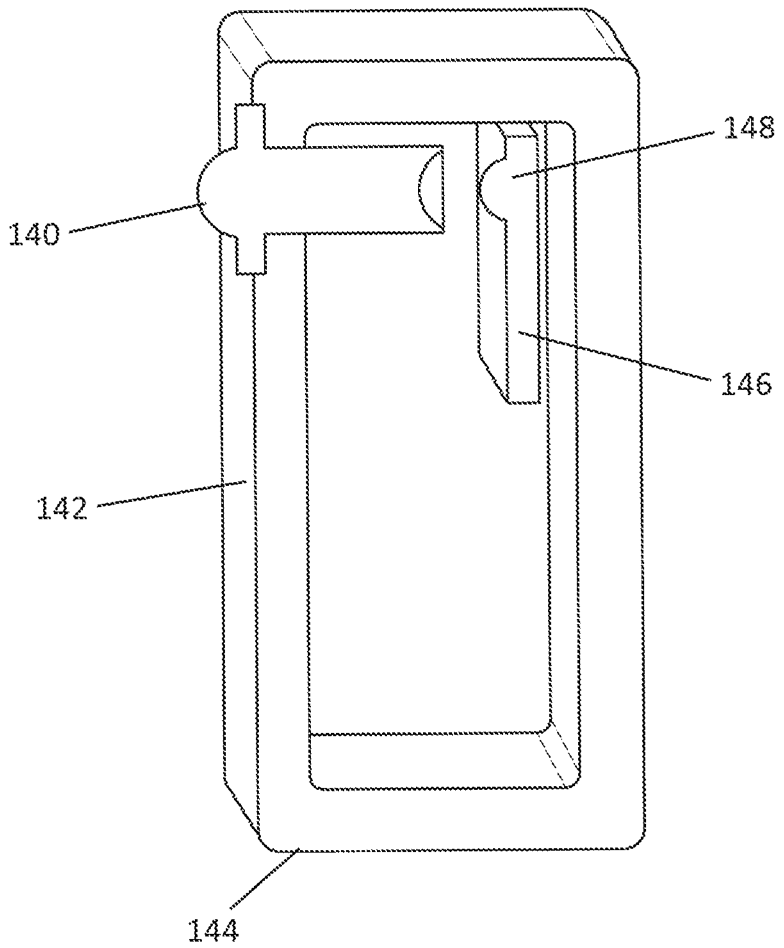
FIG. 11 illustrates a printed circuit board (PCB) having LEDs embedded in the circuit board and configured for insertion into a rectangular channel with the circuit board and LEDs to be positioned in place by a spacer.

FIG. 11 illustrates a lens 140 extending through a sidewall 142 of the rectangular channel 144. The lens is cylindrical in the shape of a pipe and configured to direct light from the LED 148 of the circuit board 146 through the cylindrical lens and outward. A flange extends around the cylindrical pipe and is positioned in a recess in the side wall of the metal channel for mounting the lens in the sidewall. Recessing the lens in the sidewall increases protection of the lens.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. A modular light strip system for temporary use on a top surface of a roadway, said light strip system comprises:

a plurality of modular elongate light strips configured for removable attachment to the top surface of the roadway, wherein said light strips are configured for withstanding vehicular traffic driving over said light strip, wherein said light strip is configured with a plurality of LED lights that are configured to be seen by a driver of a vehicle approaching the light strip, wherein said light strip is configured for connection to a power source for powering said LED lights, wherein each of said light strips comprising a housing comprising a bottom side configured for removable placement on the top surface of the roadway with said housing extending above the top surface of the roadway with said LED lights positioned above said bottom surface when said light strips are removably attached to the top surface of the roadway;

wherein said light strips are configured for attachment to one another to provide continuous power through said light strips.

2. The light strip system of claim 1, wherein each housing comprises a channel, wherein said LEDs are positioned within said housing, wherein a power supply is positioned within said each of said channels and configured to provide power to said LEDs, wherein a plurality of lenses are positioned within a wall of said channel and configured to direct light from said LEDs outward from said housing.

3. The light strip system of claim 2, wherein said channel comprises a rectangular channel.

4. The light strip system of claim 2, wherein said channel comprises a water resistant protective material filling said channel and configured to protect said LED lights and power supply in said channel.

5. The light strip system of claim 4, wherein said protective material comprises a polyurethane resin.

6. The light strip system of claim 1, wherein said light strip comprises at least one flange configured for placement of a connector through said flange to connect said light strip to the roadway.

7. The light strip system of claim 1, wherein said light strip system comprises a sensor configured to detect the presence of an oncoming vehicle.

8. The light strip system of claim 7, wherein said sensor is configured to detect the presence of a pedestrian preparing to cross said roadway.

9. The light strip system of claim 1 further comprising said power source.

10. The light strip system of claim 9, wherein said power source comprises a power storage device.

11. The light strip system of claim 8, wherein said power source comprises a solar panel.

12. The light strip system of claim 1, wherein said power source comprises a power grid.

13. The light strip system of claim 1, wherein a first end of each of said light strips comprises a female connector, wherein a second end of each of said light strips comprises a male connector configured to mate and engage with said female connector so as to transmit power between said male and female connector.

14. The light strip system of claim 1, wherein said light strip system comprises a controller, wherein said controller is configured to cause said light strip to illuminate and/or flash in response to a signal received from a push button and/or sensor.

15. The light strip system of claim 14, wherein said sensor is wirelessly connected to said controller.

16. The light strip system of claim 1, wherein said light strip is configured to removably attach to said roadway by one or more of a mounting anchor, an adhesive, double sided tape, and strap connection.

17. A light strip system comprising:

a plurality of modular elongate light strips, wherein said light strips each comprises a first end and a second end and a length extending between, wherein said light strips comprise a rigid channel housing a series of LEDs, wherein each of said light strips is configured for attachment to one another at the first end and the second end of each of said light strips, wherein said light strips are configured to receive power at the first end of said light strips and are configured to provide power to subsequent light strips connected at the second end of said light strips, wherein said light strips are configured for removable attachment to a top surface of a roadway such that the light strips are positioned on top of the road surface and configured for motorized vehicles to drive over said light strips;

a connector for connecting said light strips to a power source.

18. The light strip system of claim 17, wherein said LEDs are mounted on a circuit board extending through said channel.

19. The light strip system of claim 17, wherein said channel comprises a polymer resin filling said channel.

20. The light strip system of claim 17, wherein said LEDs are positioned entirely within said channel, wherein said channel comprises a plurality of lenses extending through a sidewall of said channel to direct light from said LEDs through said sidewall of said channel.

21. The light strip system of claim 1, wherein each of said light strips is configured to direct light horizontally away from the light strip at oncoming traffic when said light strips are attached to a road surface.

22. The light strip system of claim 17, wherein each of said light strips is configured to direct light horizontally away from the light strip at oncoming traffic when said light strips are attached to a road surface.

* * * * *